US008779356B2

(12) United States Patent
Covey et al.

(10) Patent No.: US 8,779,356 B2
(45) Date of Patent: Jul. 15, 2014

(54) METHOD AND SYSTEM FOR PROVIDING A DUAL CURTAIN GAS TO A MASS SPECTROMETRY SYSTEM

(75) Inventors: Thomas R. Covey, Ontario (CA); Stanislaw Potyrala, Ontario (CA); Bradley B. Schneider, Ontario (CA)

(73) Assignee: DH Technologies Development Ptd. Ltd., Singapore (SG)

(*) Notice: Subject to any disclaimer, the term of this patent is extended or adjusted under 35 U.S.C. 154(b) by 0 days.

(21) Appl. No.: 13/821,148

(22) PCT Filed: Sep. 14, 2011

(86) PCT No.: PCT/US2011/051543
§ 371 (c)(1), (2), (4) Date: Jun. 17, 2013

(87) PCT Pub. No.: WO2012/047465
PCT Pub. Date: Apr. 12, 2012

(65) Prior Publication Data

US 2013/0264493 A1 Oct. 10, 2013

Related U.S. Application Data

(60) Provisional application No. 61/386,917, filed on Sep. 27, 2010.

(51) Int. Cl.
*H01J 49/24* (2006.01)
*B01D 59/44* (2006.01)

(52) U.S. Cl.
USPC ........... 250/282; 250/281; 250/283; 250/287; 250/288; 250/289; 250/290; 250/291; 250/292

(58) Field of Classification Search
USPC ................................. 250/281–283, 287–292
See application file for complete search history.

(56) References Cited

U.S. PATENT DOCUMENTS

2009/0294650 A1* 12/2009 Schneider et al. ............ 250/282
2010/0282966 A1* 11/2010 Schneider et al. ............ 250/282
2012/0280120 A1* 11/2012 Schneider et al. ............ 250/282

* cited by examiner

*Primary Examiner* — Jack Berman
*Assistant Examiner* — Meenakshi Sahu

(57) ABSTRACT

A system and method for mass spectrometry including a curtain gas chamber defined by a curtain plate having an aperture for receiving ions from an ion source and an orifice plate having an inlet into a mass spectrometer. At least one barrier separates the curtain chamber into a first curtain gas chamber region and a second curtain gas chamber region. At least one gas source provides a gas inflow into the second curtain gas chamber region and a gas outflow into the first curtain gas chamber region, a portion of the gas outflow directed out of the aperture. A heating element heats the gas inflow, a portion of the heated gas inflow directed into the inlet of the mass spectrometer wherein the portion of the heated gas inflow can be at a substantially higher temperature than the portion of the gas outflow.

20 Claims, 10 Drawing Sheets

Prior Art

Prior Art

METHOD AND SYSTEM FOR PROVIDING A DUAL CURTAIN GAS TO A MASS SPECTROMETRY SYSTEM

CROSS REFERENCE TO RELATED APPLICATIONS

This application is a National Stage filing under 35 U.S.C. §371 of PCT/US2011/051543 filed on Sep. 14, 2011, which is designated the U.S., and which claims the benefit of U.S. Provisional Application Ser. No. 61/386,917 filed on Sep. 27, 2010, the contents of which are incorporated herein by reference in their entireties.

FIELD

The applicants' teachings relate to a method and system for providing a dual curtain gas to a system for mass spectrometry.

INTRODUCTION

In mass spectrometry systems, curtain gas is heated in the region between the curtain plate and the inlet to the mass spectrometer to provide an improvement in sensitivity. The curtain gas flow passes over the surface of a hot heater or through a heat exchanger region causing the curtain gas temperature to increase. The hot curtain gas then splits into two flows, one directed into the inlet of the mass spectrometer and the other directed out of the aperture in the curtain plate into the ion source region.

Although the heated curtain gas can improve performance, a hot outflow of curtain gas from the curtain plate can produce problems, especially when using low flow rate electrospray sources that do not operate with a cooling nebulizer or sheath gas. For example, the outflow of hot curtain gas flowing over a non-nebulized tapered nanoflow sprayer can dry out the liquid in the sprayer and can plug the sprayer tip as shown in FIG. 1 causing an interruption in spray. Reducing the temperature of the curtain gas can help prevent spray disruption, but the result is undesirable since sensitivity is reduced.

SUMMARY

In accordance with an aspect of the applicants' teachings, a system for mass spectrometry is provided. The system comprises a curtain gas chamber defined by a curtain plate with an aperture for receiving ions from an ion source and an orifice plate with an inlet into a mass spectrometer. At least one barrier can be provided for separating the curtain gas chamber into a first curtain gas chamber region and a second curtain gas chamber region. In various embodiments, the at least one barrier can be bounded by the curtain plate and, in various embodiments, the second curtain gas chamber region can be bounded by the orifice plate. In various embodiments, more than one barrier can be provided to separate the curtain gas chamber, and in various aspects, multiple barriers can be provided for separating the curtain gas chamber into multiple regions. At least one gas source can be provided into the curtain gas chamber, and this gas can provide an inflow passing into the mass spectrometer and an outflow passing out of the aperture in the curtain plate and flowing into the ion source region. In various embodiments, the second curtain gas chamber region comprises a differential mobility spectrometer at least partially sealed to the inlet orifice. In various embodiments, the second curtain gas chamber region comprises a heated tube at least partially sealed to the inlet orifice.

A heating element can also be provided for heating the gas inflow, a portion of the heated gas inflow can be directed into the inlet of the mass spectrometer wherein the portion of the heated gas inflow can be at a substantially higher temperature than the portion of the gas outflow.

In various embodiments, the heating element can comprise a heated orifice plate, one or more heated tubes, or, in a DMS configuration, a heater and heat exchanger material to heat the curtain gas inflow. In various aspects, the at least one gas source comprises a gas transport tube and the at least one gas source supplies nitrogen, an inert gas, mixtures of gases, gas with added vapors, or any other suitable gas. In various embodiments, the at least one gas source comprises a first gas source into the first curtain gas chamber region and a second gas source into the second curtain gas chamber region. In various aspects, the gas composition and the gas temperature can be independently controlled and the composition of the first gas source can be different from the composition of the second gas source. In various embodiments, the second gas source includes a chemical modifier, such as propanol. In various aspects, the at least one barrier comprises a stainless steel plate.

In various aspects, a method for mass spectrometry is provided. The method comprises providing a curtain gas chamber, the curtain gas chamber defined by a curtain plate having an aperture for receiving ions from an ion source and an orifice plate having an inlet into a mass spectrometer. The method further comprises providing at least one barrier for separating the curtain gas chamber into a first curtain gas chamber region and a second curtain gas chamber region. In various embodiments, the first curtain gas chamber region can be bounded by the curtain plate and, in various embodiments, the second curtain gas chamber region can be bounded by the orifice plate. In various embodiments, more than one barrier can be provided to separate the curtain gas chamber, and in various aspects, multiple barriers can be provided for separating the curtain gas chamber into multiple regions. At least one gas source can be provided having a gas inflow into the second curtain gas chamber region and a gas outflow into the first curtain gas chamber region, a portion of the gas outflow directed out of the aperture and into an ion source region. The method further comprises providing a heating element for heating the gas inflow, a portion of the heated gas inflow directed into the inlet of the mass spectrometer wherein the portion of the heated gas inflow is at a substantially higher temperature than the portion of the gas outflow.

In various embodiments, the heating element can comprise a heated orifice plate, one or more heated tubes, or a heater and heat exchanger material to heat the curtain gas inflow. In various embodiments, the desolvation of ions can be controlled by providing a heated element, such as a heated tube, at least partially sealed to the mass spectrometer inlet. In various aspects, the at least one gas source comprises a gas transport tube and the at least one gas source supplies nitrogen, an inert gas, mixtures of gases, gas with added vapors, or any other suitable gas. In various embodiments, the at least one gas source comprises a first gas source into the first curtain gas chamber region and a second gas source into the second curtain gas chamber region. In various aspects, the gas composition and the gas temperature can be independently controlled and the composition of the first gas source can be different from the composition of the second gas source. In various embodiments, the second gas source comprises a modifier, such as propanol. In various aspects, the at least one barrier comprises a stainless steel plate. In various embodiments, systems and methods for differential mobility spectrometry/mass spectrometry DMS/MS are provided. The systems and methods provide a curtain gas chamber defined by the region between a curtain plate having an aperture to receive ions from an ion source and an orifice plate having an inlet into a mass spectrometer. The system and method further comprise sealing the output end of a DMS to the inlet orifice such that the gas draw from the inlet orifice establishes a gas flow into the DMS inlet and laminar gas flow down the length of the DMS device. In various embodiments, ions can be prefiltered by the differential mobility spectrometer at least partially sealed to the mass spectrometer inlet. The system and method further comprise providing at least one barrier for separating the curtain gas chamber into a first curtain gas chamber region and a second curtain gas chamber region. In various embodiments, more than one barrier can be provided to separate the curtain gas chamber, and in various aspects, multiple barriers can be provided for separating the curtain gas chamber into multiple regions. In various embodiments, the first curtain gas chamber region can be bounded by the curtain plate and, in various embodiments, a second curtain gas chamber region can be bounded by the inlet to the DMS and inlet orifice. The system and method further comprises providing at least one gas source into each of the first and second curtain chamber regions, the gas flow to the first curtain chamber region forming a gas outflow from the curtain plate aperture into the ion source, and the gas flow to the second curtain chamber region forming a gas inflow into the DMS and mass spectrometer inlet. In various aspects, the gas composition and gas temperature can be independently controlled such that the gas outflow and gas inflow have different characteristics. In various embodiments, the gas inflow can contain chemical modifiers for improving the peak capacity for mobility separations in DMS, while the gas outflow cannot. In various embodiments, heaters can be provided to control the temperature of either the curtain chamber regions or gas flows.

These and other features of the applicants' teachings are set forth herein.

BRIEF DESCRIPTION OF THE DRAWINGS

The skilled person in the art will understand that the drawings, described below, are for illustration purposes only. The drawings are not intended to limit the scope of the applicants' teachings in any way.

In the drawings, like reference numerals indicate like parts.

DESCRIPTION OF VARIOUS EMBODIMENTS

Figure 1:
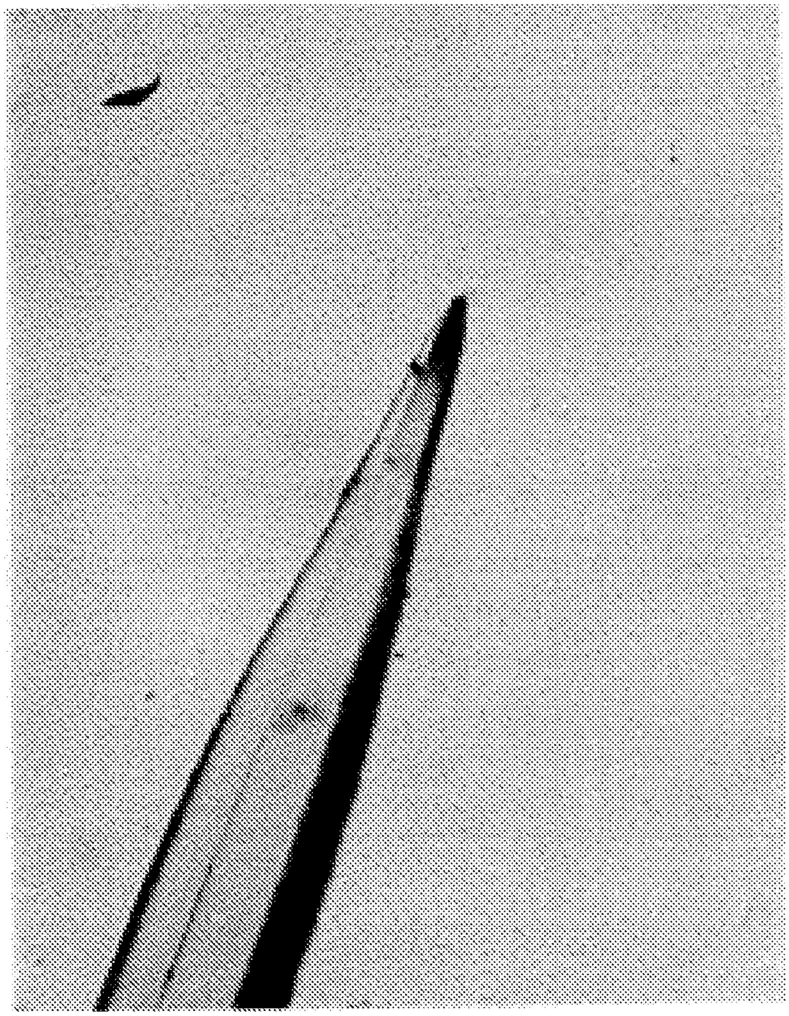
FIG. 1 schematically shows a plugged nanoflow sprayer tip in accordance with the prior art.

It should be understood that the phrase "a" or "an" used in conjunction with the applicants' teachings with reference to various elements encompasses "one or more" or "at least one" unless the context clearly indicates otherwise. Reference is first made to FIG. 1 which shows how in a prior art mass spectrometry system, an outflow of hot curtain gas flowing over a non-nebulized tapered nanoflow sprayer can dry out the liquid in the sprayer and can plug the sprayer tip causing an interruption in the spray.

Figure 2:
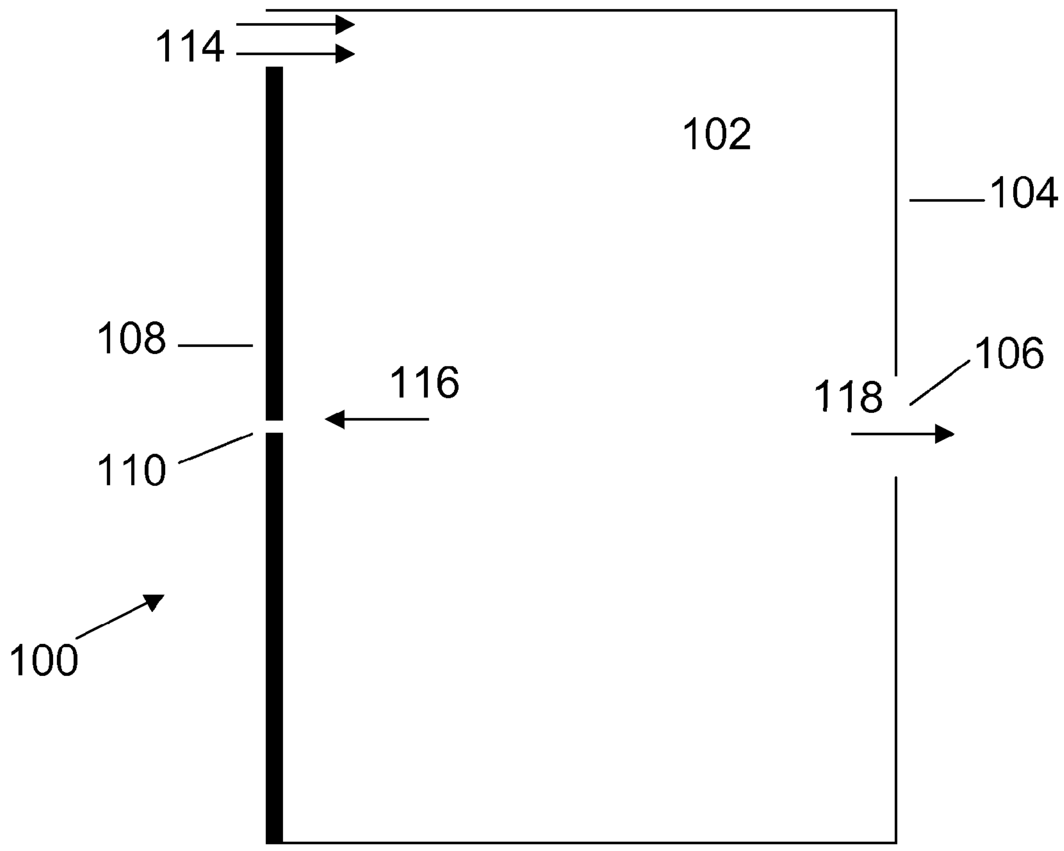
FIG. 2 schematically illustrates a mass spectrometry system in accordance with the prior art.

Referring to the prior art mass spectrometry system 100 shown in FIG. 2, the mass analysis system 100 has a curtain gas chamber 102 defined by a curtain plate 104 having an aperture 106 for receiving ions from an ion source (not shown) and an orifice plate 108 having an inlet 110 into a mass spectrometer. A gas source 114 provides a gas flow that is preheated or heated by additional heaters in the curtain gas chamber 102. In addition, the orifice plate 108 can also be heated. In the prior art system 100, the total curtain gas input into the curtain gas chamber 102 is heated prior to splitting into a curtain gas inflow 116, a portion of which flows into the inlet 110, and a curtain gas outflow 118, a portion of which flows out of the aperture 106 into an ion source region. The curtain gas outflow 118 is heated prior to flowing out of the aperture 106.

Figure 3:
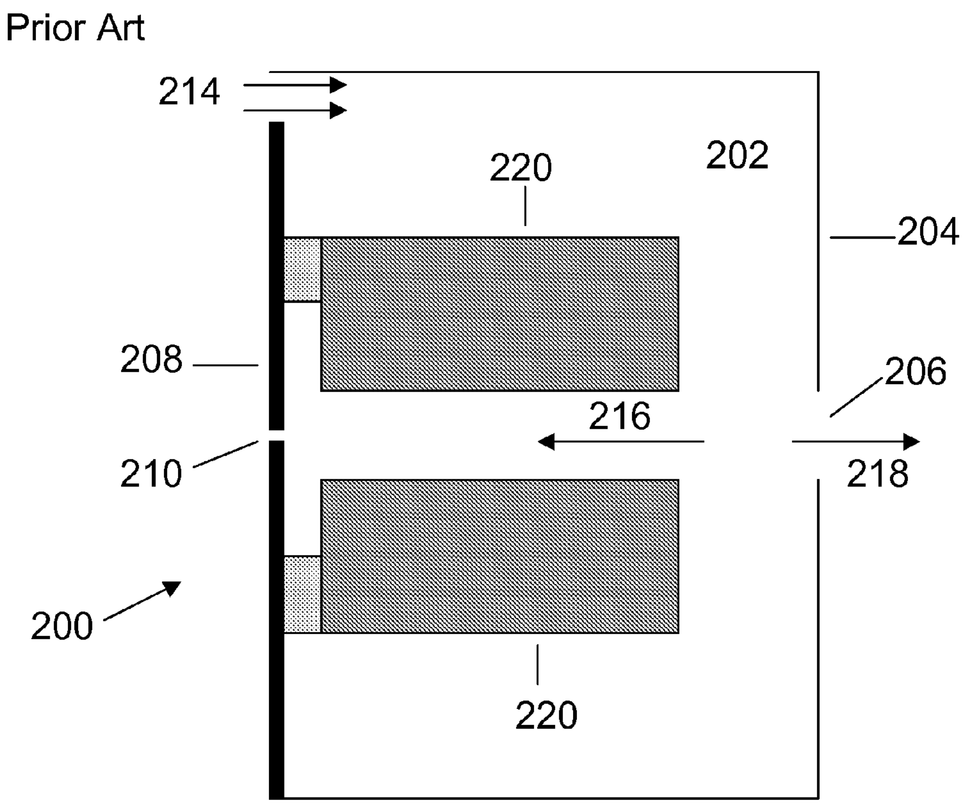
FIG. 3 schematically illustrates a mass spectrometry system in accordance with the prior art.

Referring to FIG. 3, there is illustrated in a schematic diagram, a prior art system 200. For clarity, elements of the system 200 of FIG. 3 that are analogous to elements of the system 100 of FIG. 2 are designated using the same reference numerals as in FIG. 2, with 100 added. In FIG. 3, the mass analysis system 200 has a curtain gas chamber 202 defined by a curtain plate 204 having an aperture 206 for receiving ions from an ion source (not shown) and an orifice plate 208 having an inlet 210 into a mass spectrometer. A gas source 214 provides a gas flow that is preheated or heated by additional heaters in the curtain gas chamber 202. In addition, the orifice plate 208 can also be heated or an additional device 220, as known to those skilled in the art, can be provided to directly or indirectly heat the curtain gas chamber 202. For example, one or more heated tubes can be provided to heat the curtain gas or, in the case of a differential mobility spectrometer (DMS), a heater and heat exchange material can be provided to heat the curtain gas flow. In the prior art system 200, the total curtain gas input into the curtain gas chamber 202 is heated prior to splitting into a curtain gas inflow 216, a portion of which flows into the inlet 210, and a curtain gas outflow 218, a portion of which flows out of the aperture 206 into an ion source region. The curtain gas outflow 218 is heated prior to flowing out of the aperture 206. Additional device 220 can comprise a heated tube, laminar flow chamber, or ion mobility device such as a differential mobility spectrometer.

Figure 4:
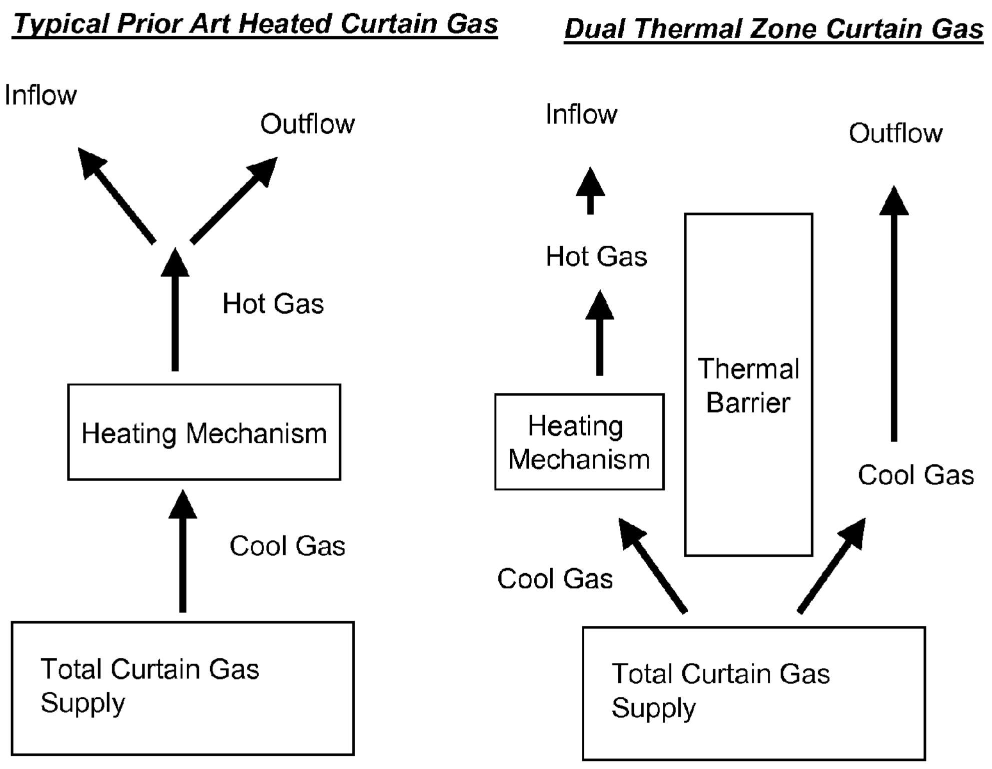
FIG. 4 schematically compares a prior art mass spectrometry system with a mass spectrometry system in accordance with various embodiments of the applicants' teachings.

Referring to FIG. 4, a comparison is shown between a typical prior art mass spectrometry system and a mass spectrometry system in accordance with various embodiments of the applicants' teachings. In the prior art system, shown on the left side, a gas source or supply provides a curtain gas flow that is heated by a heating element or mechanism. The hot curtain gas is then split into a curtain gas inflow, a portion of which is directed into an inlet of a mass spectrometer, and a curtain gas outflow, a portion of which is directed out of the aperture of the curtain plate and into an ion source region. The hot curtain gas outflow can then produce problems, especially when using low flow rate electrospray sources that do not operate with a cooling nebulizer or sheath gas. Examples of these types of sources are nanospray sources and automated devices such as the Advion Nanomate system. For example, the outflow of hot curtain gas flowing over a non-nebulized tapered nanoflow sprayer can dry out the liquid in the sprayer and can plug the sprayer tip as shown in FIG. 1, causing an interruption in spray.

In various embodiments of the applicants' teachings, shown on the right side of FIG. 4, at least one gas source or supply provides a gas flow that can be first split into a curtain gas inflow and a curtain gas outflow. A barrier can be provided to separate the curtain gas inflow and the curtain gas outflow. In various aspects, the barrier can be a thermal barrier. In various aspects, the at least one barrier comprises a stainless steel plate. The curtain gas inflow can be heated by a heating element or mechanism, and a portion of the heated curtain gas inflow is directed into an inlet of a mass spectrometer. The curtain gas outflow, a portion of which is directed out of the aperture of the curtain plate into an ion source region, is not heated and can therefore prevent problems produced by the heated curtain gas outflow of the prior art system.

Figure 5:
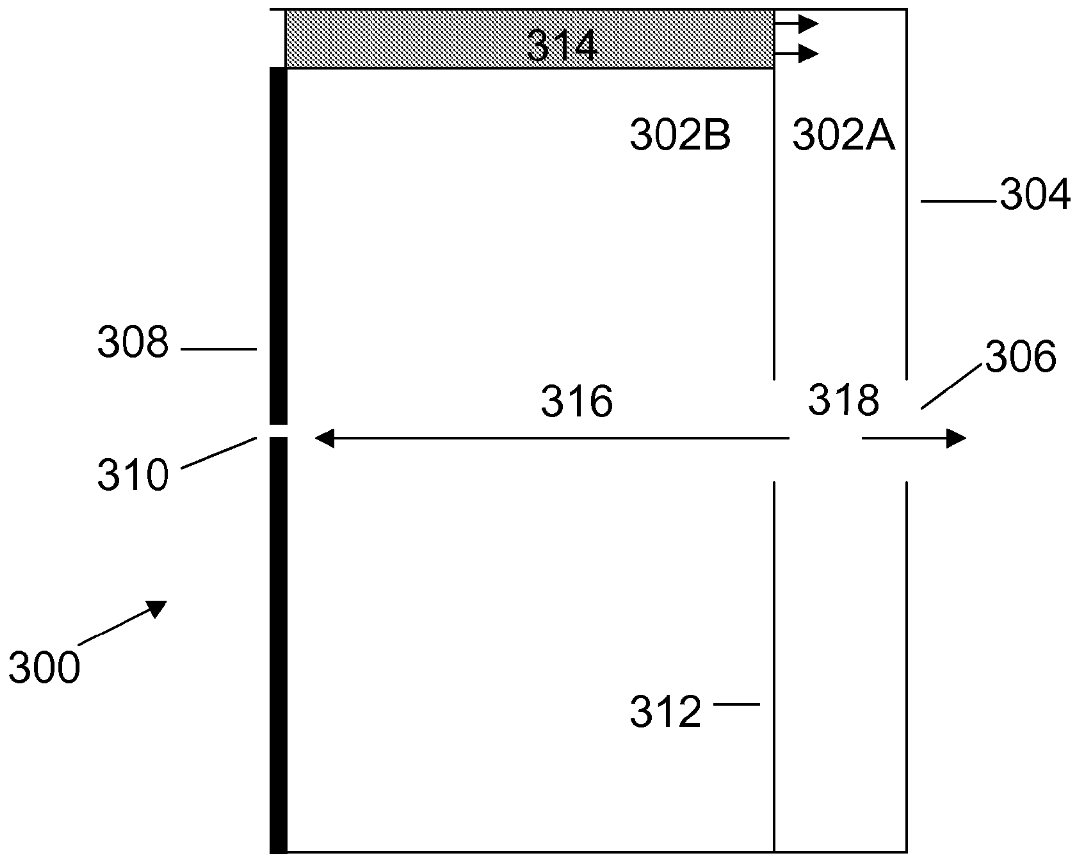
FIG. 5 schematically illustrates a mass spectrometry system in accordance with various embodiments of the applicants' teachings.

Referring to FIG. 5, in various embodiments in accordance with the applicants' teachings, a mass spectrometry system 300 comprises a curtain gas chamber defined by a curtain plate 304 having an aperture 306 for receiving ions from an ion source (not shown) and an orifice plate 308 having an inlet 310 into a mass spectrometer. In various embodiments, any suitable mass spectrometer inlet can be used, including, but not limited to a capillary, heated capillary, or dielectric capillary. A barrier 312 can separate the curtain gas chamber into a first curtain gas chamber region 302A and a second curtain gas chamber region 302B. In various aspects, the barrier 312 can be a thermal barrier to limit the heat transfer between the two regions. In various aspects, the at least one barrier comprises a stainless steel plate. In various embodiments, more than one barrier can be provided to separate the curtain gas chamber, and in various aspects, multiple barriers can be provided for separating the curtain gas chamber into multiple regions. At least one gas source 314, for example a gas transfer tube, can be provided to deliver a gas flow into the first curtain chamber region 302A. A portion of the gas flow can form a gas inflow 316, drawn through the second curtain chamber region 302B, and into the mass spectrometer inlet 310. Another portion of the gas flow can form an outflow from the first curtain chamber region 302A through the aperture 306 in the curtain plate 304 and into the source region. Factors such as the inlet size and gas temperature can be used to determine the gas flow rate into a vacuum system of the mass spectrometer and therefore the magnitude of the gas inflow 316. Therefore, in various embodiments, the gas flow provided by gas source 314 can be adjusted to control the magnitude of gas outflow 318. For instance, if the gas flow into the mass spectrometer inlet is 3.2 L/min, then a gas flow of 3.6 L/min provided by gas source 314 will result in an inflow 316 of 3.2 L/min and an outflow 318 of 0.4 L/min. The at least one gas source can supply nitrogen, an inert gas, mixtures of gases, gas with added vapors, or any other suitable gas as known to those skilled in the art. A heating element or mechanism can be provided for heating the gas inflow in the second curtain gas chamber region 302B, a portion or all of the heated gas inflow 316 can be directed into the inlet 310 of the mass spectrometer wherein the heated gas inflow 316 can be at a substantially higher temperature than the portion of the gas outflow 318 since the curtain gas flow splits into a curtain gas inflow and a curtain gas outflow prior to heating of the curtain gas inflow thereby allowing the two gas flows to be at substantially different temperatures. The heating element or mechanism can comprise heating the orifice plate 308, providing additional heating elements or mechanisms, such as heating devices within the second curtain chamber region 302B, or any other gas heating mechanism as known to those skilled in the art.

Figure 6:
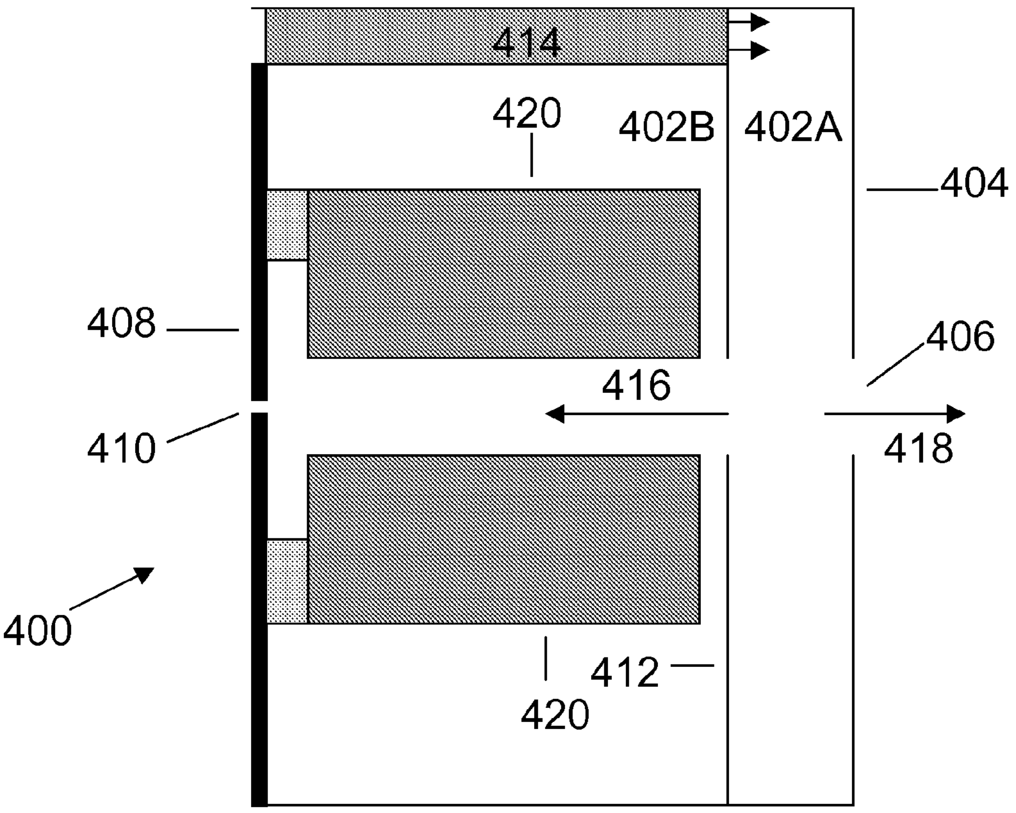
FIG. 6 schematically illustrates a mass spectrometry system in accordance with various embodiments of the applicants' teachings.

Referring to FIG. 6, in various embodiments in accordance with the applicants' teachings, a mass spectrometry system 400 comprises a curtain gas chamber defined by a curtain plate 404 having an aperture 406 for receiving ions from an ion source (not shown) and an orifice plate 408 having an inlet 410 into a mass spectrometer. In various embodiments, any suitable mass spectrometer inlet can be used, including, but not limited to a capillary, heated capillary, or dielectric capillary. A barrier 412 can separate the curtain gas chamber into a first curtain gas chamber region 402A and a second curtain gas chamber region 402B. In various aspects, the barrier 412 can be a thermal barrier. In various aspects, the at least one barrier comprises a stainless steel plate or other material with poor thermal conductivity. In various embodiments, more than one barrier can be provided to separate the curtain gas chamber, and in various aspects, multiple barriers can be provided for separating the curtain gas chamber into multiple regions. At least one gas source 414, for example a gas transfer tube, can be provided into the first curtain chamber region 402A, to yield a gas inflow 416 into the second curtain gas chamber region 402B and a gas outflow 418 directed out of the aperture 406 of the curtain plate 404 and into an ion source region. The gas inflow 416 can flow through the second curtain gas chamber region 402B, through any additional devices 420, and into the mass spectrometer inlet 410. The at least one gas source can supply nitrogen, an inert gas, mixtures of gases, or gas with added vapors, or any other suitable gas as known to those skilled in the art. A heating element or mechanism can be provided for heating the gas inflow in the second curtain gas chamber region 402B, a portion of the heated gas inflow 416 can be directed into the inlet 410 of the mass spectrometer wherein the portion of the heated gas inflow 416 can be at a substantially higher temperature than the portion of the gas outflow 418 since the curtain gas flow splits into a curtain gas inflow and a curtain gas outflow prior to heating of the curtain gas inflow thereby allowing the two gas flows to be at substantially different temperatures. The heating element or mechanism can comprise heating the orifice plate 408 or any other method as known to those skilled in the art. For example, in various aspects, an additional device 420, as known to those skilled in the art, can be provided to directly or indirectly heat the curtain gas inflow 416. In various aspects, one or more heated tubes can be sealed to the mass spectrometer inlet 410 to heat the curtain gas inflow 416. The gas draw established by the inlet orifice can draw the gas inflow 416 through the heated tube 420. In various aspects, additional device 420 can comprise a differential mobility spectrometer at least partially sealed to the inlet orifice 410. The gas draw established by the orifice can draw the gas inflow 416 as well as sample ions through the DMS and into the mass spectrometer. In this manner, the gas inflow passing through the mass spectrometer can be heated to a different temperature than the gas outflow passing into the ion source. Although not shown in FIG. 6, the gas inflow 416 composition can also be different than the gas outflow 418. The composition can be varied by providing separate gas flows for the inflow 416 and the outflow 418, or by modifying the gas inflow 416 composition within the second curtain chamber region 402B, for instance by adding additional gas flows or chemicals directly into the second curtain chamber region 402B.

Figure 7:
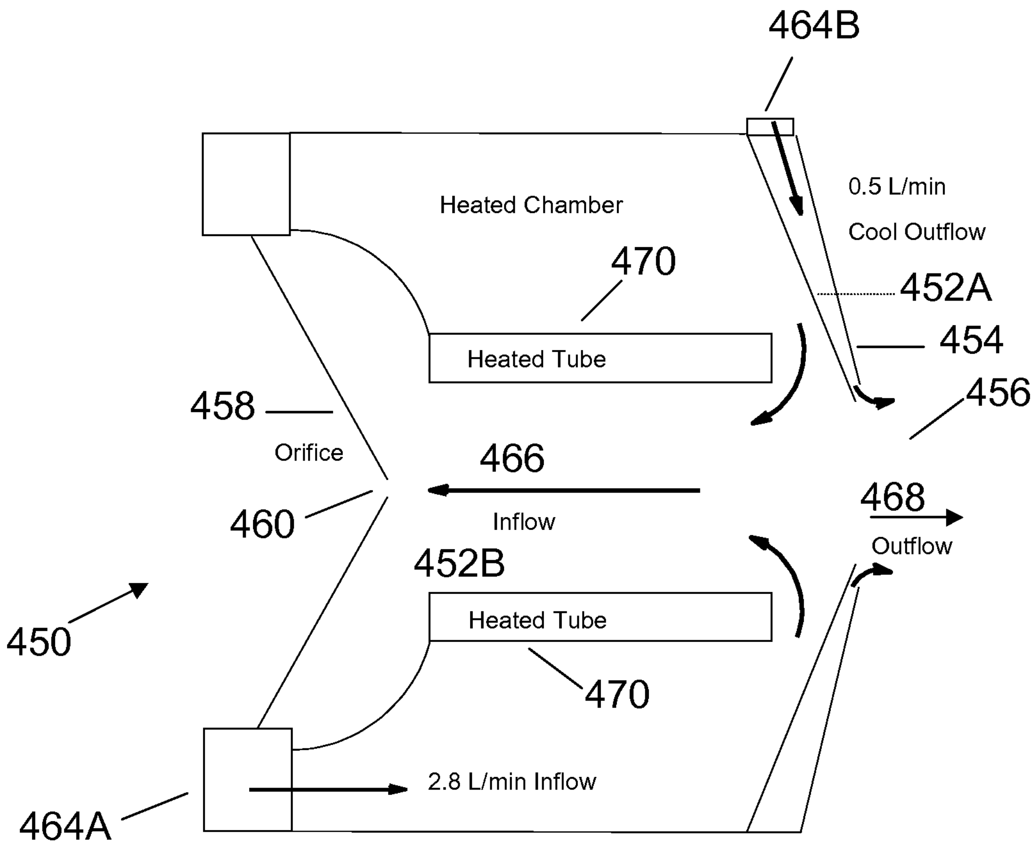
FIG. 7 schematically illustrates a mass spectrometry system in accordance with various embodiments of the applicants' teachings.

Referring to FIG. 7, in various embodiments according to the applicants' teachings, a mass spectrometry system 450 comprises two or more separate gas sources or supplies; a first gas source 464B can provide a curtain gas outflow to a first curtain gas chamber region 452 A and a second gas source 464A can provide a curtain gas inflow to a second curtain gas chamber region 452B. The gas inflow 466 can be drawn through the second curtain chamber region 452B, and into the mass spectrometer inlet 460. In various embodiments, any suitable mass spectrometer inlet can be used, including, but not limited to a capillary, heated capillary, or dielectric capillary. The gas outflow from the first curtain chamber region 452A can pass through the aperture 456 in the curtain plate 454 and into the source region. The gas provided to the second curtain gas chamber region 452B can be heated and can be provided at a flow equal to the instrument gas inflow, whereas the gas provided to the first curtain gas chamber region 452A can be cool and can be provided at a flow equal to the desired curtain gas outflow. The heating element or mechanism can comprise heating the orifice plate or providing one or more heated tubes or any other gas heating mechanism as known to those skilled in the art. For example, the heating element shown in FIG. 7 is a heated tube 470. In various embodiments, for example as shown in FIG. 7, the composition and temperature of the gas inflow and outflow can be independently controlled and optimized. Although not shown in FIG. 7, a DMS device can be included within the second curtain chamber region in addition to the heated tube, or instead of the heated tube. In various embodiments, the heated tube and DMS can be omitted such that the second curtain chamber region comprises only the mass spectrometer inlet 460, gas supplies and additional heating element or mechanism. As described above, in various embodiments, the configuration shown in FIG. 7 can include a DMS at least partially sealed to the mass spectrometer inlet 460 rather than the heated tube 470 as illustrated in FIG. 7. In various embodiments, additional chemical modifiers such as alcohols, acetonitrile, chlorinated compounds, or any other chemical modifiers can be added to modify the composition of the gas inflow for improving the peak capacity for differential mobility spectrometry separations as will be known to those skilled in the art. The outflow composition can be nitrogen to provide a gas curtain between the inner curtain chamber region and the ion source. In this manner, the outflow gas composition and temperature can be independently optimized for declustering, preventing instrumental contamination, and drying the ion flow from the source, while the inflow gas composition can be optimized for differential mobility separations prior to the mass spectrometer inlet. It will be apparent to those skilled in the art that a differential mobility spectrometer comprises other necessary components, such as an asymmetric waveform generator, controller, and electrical connections that are not illustrated in FIG. 7.

Figure 8:
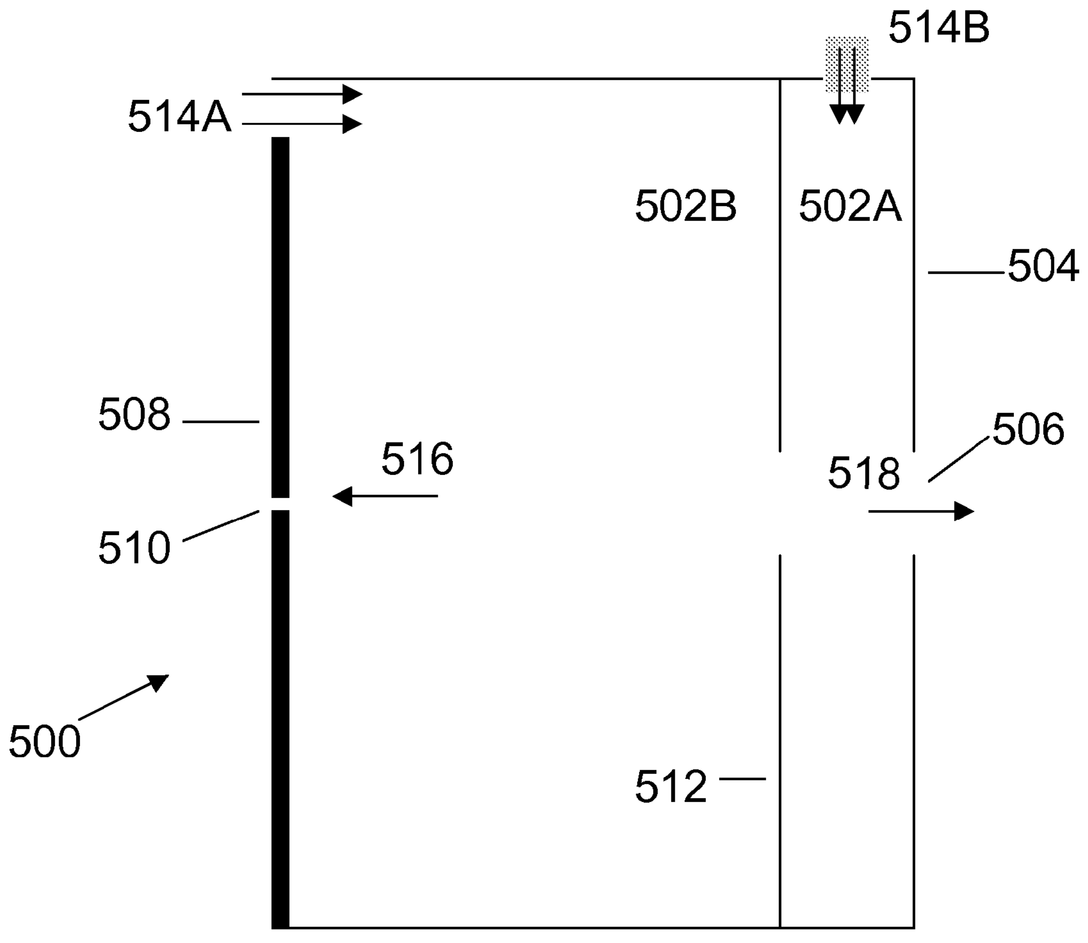
FIG. 8 schematically illustrates a mass spectrometry system in accordance with various embodiments of the applicants' teachings.

Referring to FIG. 8, in various embodiments in accordance with the applicants' teachings, a mass spectrometry system 500 comprises a curtain gas chamber defined by a curtain plate 504 having an aperture 506 for receiving ions from an ion source (not shown) and an orifice plate 508 having an inlet 510 into a mass spectrometer. In various embodiments, any suitable mass spectrometer inlet can be used, including, but not limited to a capillary, heated capillary, or dielectric capillary. A barrier 512 can separate the curtain gas chamber into a first curtain gas chamber region 502A and a second curtain gas chamber region 502B. In various aspects, the barrier 512 can be a thermal barrier to limit thermal transfer between the two regions. In various aspects, the at least one barrier comprises a stainless steel plate. In various embodiments, more than one barrier can be provided to separate the curtain gas chamber, and in various aspects, multiple barriers can be provided for separating the curtain gas chamber into multiple regions. Two separate gas sources or supplies can be provided; a first gas source 514B can provide a curtain gas outflow 518 to the first curtain gas chamber region 502A, a portion of the curtain gas outflow 518 can be directed out of the aperture 506 of the curtain plate 504 and into an ion source region. The second gas source 514A can provide a curtain gas inflow 516 to a second curtain gas chamber region 502B. A heating element or mechanism can be provided for heating the gas inflow 516 in the second curtain gas chamber region 502B, a portion of the heated gas inflow 516 can be directed into the inlet 510 of the mass spectrometer wherein the portion of the heated gas inflow 516 can be at a substantially higher temperature than the portion of the gas outflow 518 since the curtain gas flow splits into a curtain gas inflow and a curtain gas outflow prior to heating of the curtain gas inflow thereby allowing the two gas flows to be at substantially different temperatures. The heating element or mechanism can comprise heating the orifice plate 308, providing additional heaters within the second curtain chamber region 502B, or any other method as known to those skilled in the art. When the gas flow from the second gas source 514A matches the gas draw of the curtain gas inflow 516 into the inlet orifice 510, the gas flow from the first gas source 514B can exclusively comprise the curtain gas outflow 518. In various aspects, the temperature and the gas composition of the gases flowing from the separate gas sources 514A and 514B can be independently controlled. In various aspects, the composition of the first gas source 514B can be nitrogen and in various aspects, the composition of the second gas source 514A can be nitrogen, a gas mixture, or any other suitable gas as known to those skilled in the art. Although not shown in FIG. 8, second curtain gas chamber region 502B can also contain a differential mobility spectrometer, and the composition and temperature of curtain gas inflow 516 can be modified to improve differential mobility separations for instance by using gas mixtures, inert gases, mixtures of gases with liquid vapors, or any other gas composition as known to those skilled in the art. In various embodiments, gas inflow 516 can comprise nitrogen with a small fraction of the vapor of a polar liquid modifier such as an alcohol, chlorinated compound, acetonitrile, or any other suitable modifier, while gas outflow 518 can comprise nitrogen or any other suitable gas composition as known to those skilled in the art.

Figure 9:
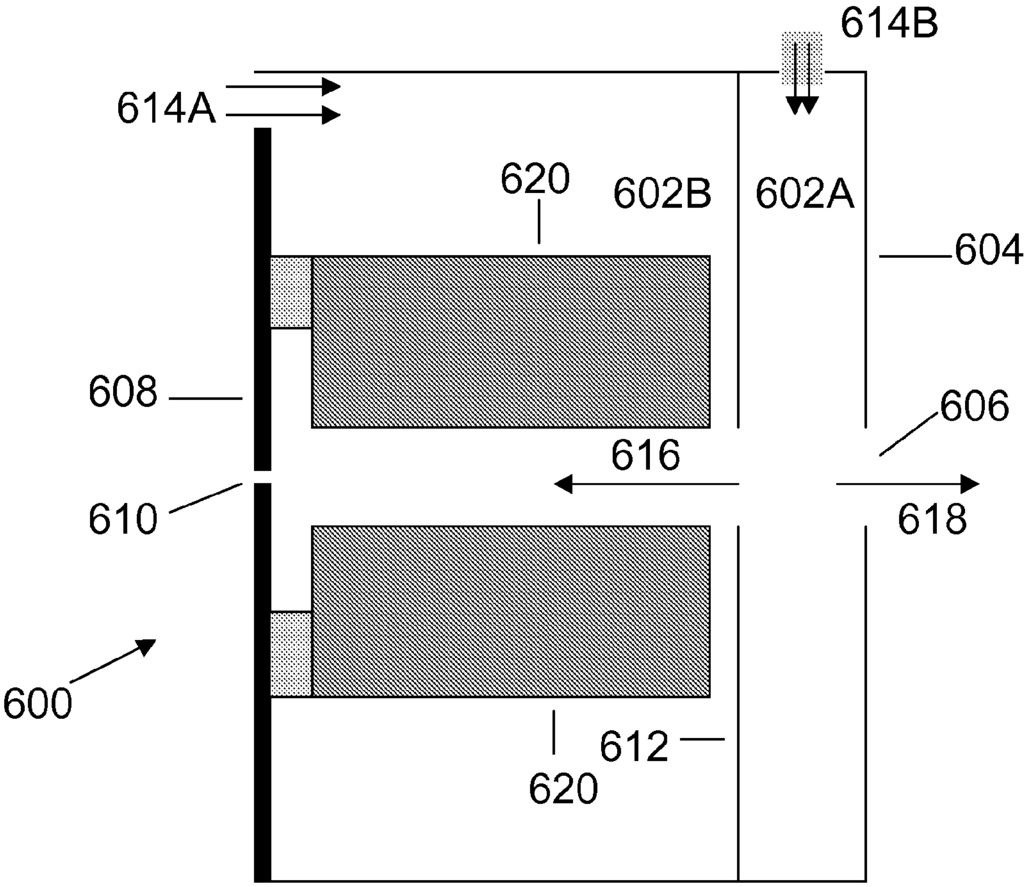
FIG. 9 schematically illustrates a mass spectrometry system in accordance with various embodiments of the applicants' teachings.

Referring to FIG. 9, in various embodiments in accordance with the applicants' teachings, a mass spectrometry system 600 comprises a curtain gas chamber defined by a curtain plate 604 having an aperture 606 for receiving ions from an ion source (not shown) and an orifice plate 608 having an inlet 610 into a mass spectrometer. In various embodiments, any suitable mass spectrometer inlet can be used, including, but not limited to a capillary, heated capillary, or dielectric capillary. A barrier 612 can separate the curtain gas chamber into a first curtain gas chamber region 602A and a second curtain gas chamber region 602B. In various aspects, the barrier 612 can be a thermal barrier. In various aspects, the at least one barrier comprises a stainless steel plate. In various embodiments, more than one barrier can be provided to separate the curtain gas chamber, and in various aspects, multiple barriers can be provided for separating the curtain gas chamber into multiple regions. Two separate gas sources or supplies can be provided; a first gas source 614B can provide a curtain gas outflow 618 to the first curtain gas chamber region 602A, a portion of the curtain gas outflow 618 can be directed out of the aperture 606 of the curtain plate 604 and into an ion source region. The second gas source 614A can provide a curtain gas inflow 616 to a second curtain gas chamber region 602B. A heating element or mechanism can be provided for heating the gas inflow 616 in the second curtain gas chamber region 602B, a portion of the heated gas inflow 616 can be directed into the inlet 610 of the mass spectrometer wherein the portion of the heated gas inflow 616 can be at a substantially higher temperature than the portion of the gas outflow 618 since the curtain gas flow splits into a curtain gas inflow and a curtain gas outflow prior to heating of the curtain gas inflow thereby allowing the two gas flows to be at substantially different temperatures. The heating element or mechanism can comprise heating the orifice plate 608, providing additional heaters within the second curtain gas chamber region 602B, or any other method as known to those skilled in the art. For example, in various aspects, an additional device 620, as known to those skilled in the art, can be provided to directly or indirectly heat the curtain gas inflow 616. In various aspects, one or more heated tubes can be at least partially sealed to inlet 610 such that the gas draw through inlet 610 draws inflow 616 through the heated tube to heat the curtain gas inflow 616. In various aspects, a heater and heat exchange material can be provided to heat the curtain gas inflow 616. When the gas flow from the second gas source 614A matches the gas draw of the curtain gas inflow 616 into the inlet orifice 610, the gas flow from the first gas source 614B can exclusively comprise the curtain gas outflow 618. In various aspects, the temperature and the gas composition of the gases flowing from the separate gas sources 614A and 614B can be independently controlled. In various aspects, the composition of the first gas source 614B can be nitrogen or any other suitable gas as known to those skilled in the art and in various aspects, the composition of the second gas source 614A can be optimized for differential mobility separations. For example, the device labeled 620 in FIG. 9 can comprise a differential mobility spectrometer at least partially sealed to the inlet orifice 610 so that the gas flow into the mass spectrometer draws gas inflow 616 through the differential mobility spectrometer 620. The composition and temperature of gas inflow 616 can be optimized for differential mobility separations, while the composition and temperature of gas outflow 618 can be optimized for the particular ion source used with the system. For instance, gas inflow 616 can include chemical modifiers as known to those skilled in the art, such as alcohols, and other polar or nonpolar molecules.

Figure 10:
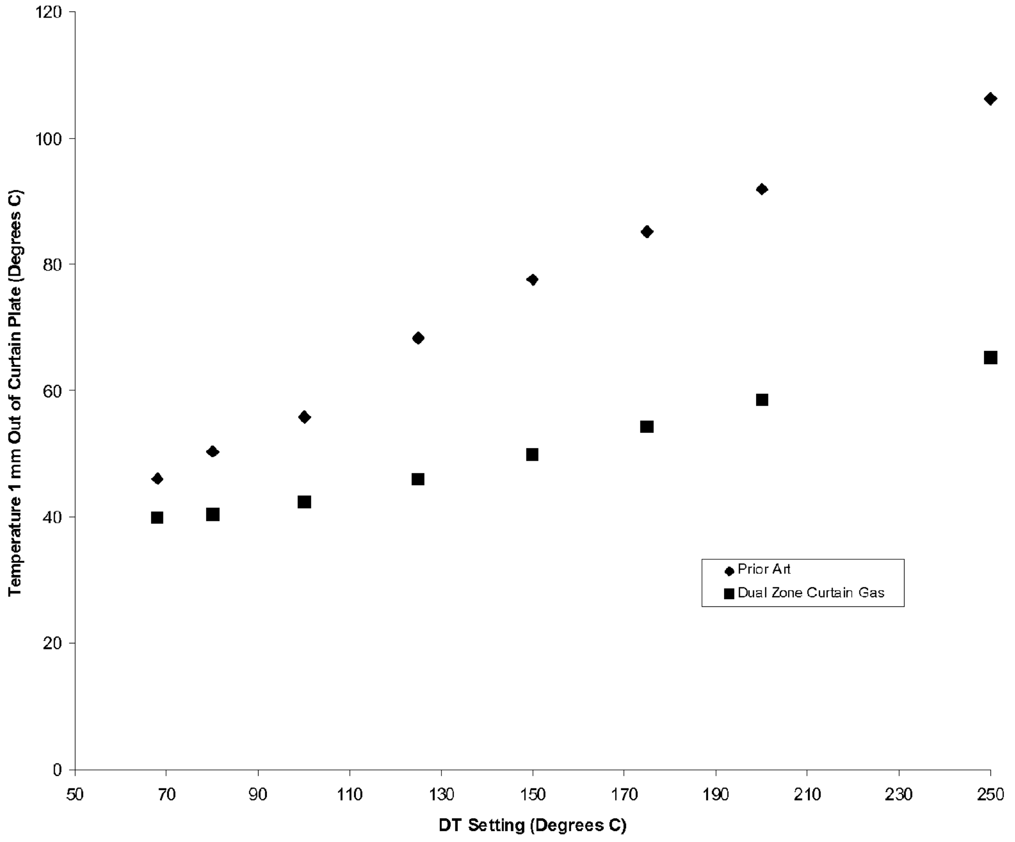
FIG. 10 compares the temperature of the curtain gas outflow of a prior art mass spectrometry system and a mass spectrometry system in accordance with FIG. 6 of the applicants' teachings.

Referring to FIG. 10, a comparison of the temperature of the curtain gas outflow of a prior art mass spectrometry system and a mass spectrometry system in accordance with FIG. 6 of the applicants' teachings is shown. For example, device 420, shown in FIG. 6, comprised a differential mobility spectrometer with dimensions 1×10×30 mm sealed to the inlet orifice of a QTRAP® 5500 mass spectrometer. The inlet gas flow rate was 2.8 L/min and a gas flow of 3.3 L/min was provided to the first curtain gas chamber region 402A, to give a curtain gas outflow of 0.5 L/min. The curtain gas outflow temperature, which was measured approximately 1 mm outside of the curtain plate, was substantially higher with the standard prior art curtain chamber configuration, exceeding 100° C. at the highest desolvation temperature (DT) setting or DMS heater temperature of 250° C. The outflow temperature of the system in accordance with FIG. 6 was substantially lower, around 60° C. with the applicants' teachings providing the possibility to apply higher DMS heater temperatures for a given outflow temperature. Similar data have also been measured using some of the other configurations as described.

For instance, in another example, a prior art nanospray interface as shown in FIG. 3 includes a heated tube 220 sealed to the inlet orifice 210. In one example, using an infusion nanospray source to generate ions from a reserpine sample prepared in 50/50 methanol/water, the measured ion current for reserpine increased as the curtain gas was heated to 150° C. However, the heating of the curtain gas above the boiling point of methanol (64.7° C.) resulted in the onset of boiling within the nanospray tip, resulting in complete loss of signal. In various embodiments of the applicants' teachings, the curtain gas outflow was maintained below 49° C. while the curtain gas inflow was approximately 150° C. using a configuration similar to FIG. 6 in which the additional device 420 comprised a heated tube sealed to the mass spectrometer inlet 410. This provided optimal desolvation characteristics in the second curtain chamber region 402B, while minimizing the outflow temperature to stabilize the performance of the nanospray system. In this manner, boiling of the liquid in the nanospray tip was eliminated, the measured signal was increased, and much better spray stability with no signal dropouts was provided.

The following describes a general use of the applicants' teachings which is not limited to any particular embodiment, but can be applied to any embodiment. In operation, in various aspects, a curtain gas chamber is provided, the curtain gas chamber defined by a curtain plate having an aperture for receiving ions from an ion source and an orifice plate having an inlet into a mass spectrometer. In various embodiments, any suitable mass spectrometer inlet can be used, including, but not limited to a capillary, heated capillary, or dielectric capillary. At least one barrier is provided for separating the curtain gas chamber into a first curtain gas chamber region and a second curtain gas chamber region. In various embodiments, more than one barrier can be provided to separate the curtain gas chamber, and in various aspects, multiple barriers can be provided for separating the curtain gas chamber into multiple regions. In various embodiments, the first curtain gas chamber region can be bounded by the curtain plate and, in various embodiments, a second curtain gas chamber region can be bounded by the orifice plate. At least one gas source can be provided having a gas inflow into the second curtain gas chamber region and a gas outflow into the first curtain gas chamber region, a portion of the gas outflow directed out of the aperture and into an ion source region; the portion of the curtain gas outflow is not heated and can therefore prevent problems produced by the heated curtain gas outflow of prior art systems. In various aspects, the at least one barrier comprises a stainless steel plate. A heating element is provided for heating the gas inflow, a portion of the heated gas inflow directed into the inlet of the mass spectrometer wherein the portion of the heated gas inflow is at a substantially higher temperature than the portion of the gas outflow.

In various embodiments, the heating element can comprise a heated orifice plate, one or more heated tubes, or, in a DMS configuration, a heater and heat exchanger material to heat the curtain gas inflow. In various aspects, the at least one gas source comprises a gas transport tube and the at least one gas source supplies nitrogen, an inert gas, mixtures of gases, gas with added vapors, or any other suitable gas. In various embodiments, the at least one gas source comprises a first gas source into the first curtain gas chamber region and a second gas source into the second curtain gas chamber region. In various aspects, the gas composition and the gas temperature can be independently controlled and the composition of the first gas source can be different from the composition of the second gas source. In various embodiments, a DMS can be at least partially sealed to the mass spectrometer inlet in place of a heated tube. In various embodiments, additional chemical modifiers such as alcohols, acetonitrile, chlorinated compounds, or other polar or nonpolar chemicals can be added to modify the composition of the gas inflow for improving the peak capacity for differential mobility spectrometry separations as will be known to those skilled in the art. The outflow composition can be nitrogen or any other suitable gas as known to those skilled in the art to provide a gas curtain between the inner curtain gas chamber region and the ion source. In this manner, the outflow gas composition and temperature can be independently optimized for declustering, preventing instrumental contamination, and drying the ion flow from the source, while the inflow gas composition can be optimized for differential mobility separations prior to the mass spectrometer inlet.

While the applicants' teachings are described in conjunction with various embodiments, it is not intended that the applicants' teachings be limited to such embodiments. On the contrary, the applicants' teachings encompass various alternatives, modifications, and equivalents, as will be appreciated by those skilled in the art.

The invention claimed is:

1. A system for mass spectrometry comprising:

a curtain gas chamber defined by a curtain plate having an aperture for receiving ions from an ion source and an orifice plate having an inlet into a mass spectrometer;

at least one barrier for separating the curtain gas chamber into a first curtain gas chamber region and a second curtain gas chamber region;

at least one gas source for providing a gas inflow into the second curtain gas chamber region and a gas outflow into the first curtain gas chamber region, a portion of the gas outflow directed out of the aperture and into an ion source region; and a heating element for heating the gas inflow, a portion of the heated gas inflow directed into the inlet of the mass spectrometer wherein the portion of the heated gas inflow is at a substantially higher temperature than the portion of the gas outflow.

2. The system of claim 1 wherein the heating element is selected from the group consisting of a heated orifice plate, one or more heated tubes, a heater, and a heater and heat exchanger material.

3. The system of claim 1 wherein the at east one gas source comprises a gas transport tube.

4. The system of claim 1 wherein the at least one gas source comprises a first gas source into the first curtain gas chamber region and a second gas source into the second curtain gas chamber region.

5. The system of claim 4 wherein the gas composition and the gas temperature can be independently controlled.

6. The system of claim 5 wherein the composition of the first gas source is different from the composition of the second gas source.

7. The system of claim 6 wherein the second gas source comprises a modifier.

8. The system of claim 1 wherein the at least one barrier comprises a stainless steel plate.

9. The system of claim 1 wherein the second curtain gas chamber region comprises a differential mobility spectrometer at least partially sealed to the inlet orifice.

10. The system of claim 1 wherein the second curtain gas chamber region comprises a heated tube at least partially sealed to the inlet orifice.

11. A method for mass spectrometry comprising:

providing a curtain as chamber, the curtain gas chamber defined by a curtain plate having an aperture for receiving ions from an ion source and an orifice plate having an inlet into a mass spectrometer;

providing at least one barrier for separating the curtain gas chamber into a first curtain gas chamber region and a second curtain gas chamber region;

providing at least one gas source for providing a gas inflow into the second curtain gas chamber region and a gas outflow into the first curtain gas chamber region, a portion of the gas outflow directed out of the aperture and into an ion source region; and providing a heating element for heating the gas inflow, a portion of the heated gas inflow directed into the inlet of the mass spectrometer wherein the portion of the heated gas inflow is at a substantially higher temperature than the portion of the gas outflow.

12. The method of claim 11 wherein the heating element is selected from the group consisting of a heated orifice plate, one or more heated tubes, a heater, and a heater and heat exchanger material.

13. The method of claim 11 wherein the at least one gas source comprises a gas transport tube.

14. The method of claim 11 wherein the at least one gas source comprises a first gas source into the first curtain gas chamber region and a second gas source into the second curtain gas chamber region.

15. The method of claim 14 wherein the gas composition and the gas temperature can be independently controlled.

16. The method of claim 15 wherein the composition of the first gas source is different from the composition of the second gas source.

17. The method of claim 16 wherein the second gas source comprises a modifier.

18. The method of claim 11 wherein the at least one barrier comprises a stainless steel plate.

19. The method of claim 11 wherein ions are prefiltered by a differential mobility spectrometer at least partially sealed to the mass spectrometer inlet.

20. The method of claim 11 wherein the desolvation of ions is controlled by providing a heated tube at least partially sealed to the mass spectrometer inlet.

* * * * *